(12) United States Patent
Somers, Jr. et al.

(10) Patent No.: US 6,908,032 B1
(45) Date of Patent: Jun. 21, 2005

(54) AUTOMATED TELLER MACHINE, SOFTWARE AND DISTRIBUTION METHOD

(75) Inventors: Charles H. Somers, Jr., North Canton, OH (US); Richard A. Steinmetz, St. Cloud, FL (US); Richard P. Brunt, Springfield, MA (US); Kenneth W. Zahorec, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 34 days.

(21) Appl. No.: 10/349,370

(22) Filed: Jan. 21, 2003

Related U.S. Application Data
(60) Provisional application No. 60/351,257, filed on Jan. 22, 2002.

(51) Int. Cl.[7] .............................................. G06F 17/60
(52) U.S. Cl. .................... 235/379; 235/381; 235/382; 705/43; 717/174
(58) Field of Search ................. 235/379, 381, 235/382, 382.5; 902/8, 14, 37, 38, 39, 40, 41; 705/43, 44, 35, 39; 713/100; 717/174; 709/221

(56) References Cited

U.S. PATENT DOCUMENTS

| | | | | |
|---|---|---|---|---|
| 5,836,104 A | * | 11/1998 | Epps | 43/122 |
| 6,360,255 B1 | * | 3/2002 | McCormack et al. | 709/221 |
| 6,505,177 B1 | * | 1/2003 | Drummond et al. | 705/43 |
| 6,520,410 B2 | * | 2/2003 | Putman et al. | 235/380 |
| 6,672,505 B1 | * | 1/2004 | Steinmetz et al. | 235/379 |
| 6,676,018 B1 | * | 1/2004 | Trelawney et al. | 235/381 |
| 6,705,517 B1 | * | 3/2004 | Zajkowski et al. | 235/379 |
| 2003/0120597 A1 | * | 6/2003 | Drummond et al. | 705/43 |
| 2003/0120935 A1 | * | 6/2003 | Teal et al. | 713/188 |
| 2003/0126084 A1 | * | 7/2003 | Drummond et al. | 705/43 |
| 2003/0141360 A1 | * | 7/2003 | De Leo et al. | 235/379 |
| 2003/0200435 A1 | * | 10/2003 | England et al. | 713/172 |
| 2003/0216172 A1 | * | 11/2003 | LeMay et al. | 463/29 |
| 2004/0010597 A1 | * | 1/2004 | Kirschner et al. | 709/228 |
| 2004/0050927 A1 | * | 3/2004 | Nozaki et al. | 235/379 |

FOREIGN PATENT DOCUMENTS

| | | | |
|---|---|---|---|
| JP | 9-81416 A | * | 3/1997 |
| JP | 2001-154879 A | * | 6/2001 |

* cited by examiner

*Primary Examiner*—Jared J. Fureman
(74) *Attorney, Agent, or Firm*—Christopher L. Parmelee; Ralph E. Jocke; Walker & Jocke (57) ABSTRACT

An automated teller machine (12) includes at least one processor (36) which operates to cause transaction function devices (16, 18, 20, 22, 24, 26, 28, 30, 32, 34) to operate to carry out banking transactions for users of the machine. A software environment (54) operates in the processor and includes a hardware independent software application (60) which application may be operated successfully in a plurality of brands of automated teller machine hardware. The automated teller machine verifies that the software application has been authorized by an appropriate authorizing entity before the application is enabled to cause operation of transaction function devices. In some distribution methods the software application is provided in source code form at generally no charge to ATM owners and software developers, who are required to contribute modifications to the entity offering the software, which modifications are further made available to facilitate the development and use of platform independent software applications in automated teller machines.

30 Claims, 7 Drawing Sheets

AUTOMATED TELLER MACHINE, SOFTWARE AND DISTRIBUTION METHOD

CROSS REFERENCE TO RELATED APPLICATION

This Application claims benefit pursuant to 35 U.S.C. § 119(e) of Provisional Application Ser. No. 60/351,257 filed Jan. 22, 2002.

TECHNICAL FIELD

This invention relates to automated teller machines. Specifically this invention relates to devices and software used in the operation of automated teller machines and a method for operation and distribution thereof.

BACKGROUND ART

Automated teller machines (ATMs) are known in the prior art. Automated teller machines may be used by consumers to carry out banking and other functions. Such functions may include for example receiving cash, making deposits, checking account balances, cashing checks, printing checks, printing statements, printing money orders and other functions. For purposes of this disclosure an automated teller machine will be considered to include any device operative to carry out one or more types of financial transactions for users of the machine.

Automated teller machines usually include one or more internal processors which carry out software instructions and enable operation of the machine. Presently most automated teller machine software is proprietary to the particular machine manufacturer. As a result the software which causes one manufacturer's automated teller machine to operate will not operate another manufacturer's automated teller machine.

Recently organizations have begun to develop standards related to devices commonly found in automated teller machines. These standards provide a generally uniform set of instructions for operating each particular type of device which is likely to be found in an automated teller machine. For example these standards may provide a generally uniform set of instructions for operating a cash dispenser to dispense a bill. As a result an entity wishing to write software to operate an automated teller machine may theoretically write a suitable software application for controlling the devices in the machine by writing the software application in accordance with the standard. In addition software written in accordance with the standard should be able to operate in automated teller machines made by different manufacturers. An example of such a standard is known as the WOSA-XFS or XFS standard which has been developed by a committee of the CEN. Other standards are also being discussed and developed.

In order for the standards to have greater value, manufacturers of automated teller machines would need to produce software that will enable the devices in their machines to operate in response to the standardized instructions. Software which enables a particular manufacturer's transaction function devices in an ATM to operate in accordance with a standard is referred to in an XFS environment or other standardized environments, as a service provider or SP software. Some manufacturers of automated teller machines have developed SP software for the transaction function devices included in their machines. However, certain manufacturers place restrictions on the availability of their SP software. As a result it is not generally feasible for a software developer to develop a hardware independent software application for operating automated teller machines produced by different manufacturers.

Further, the ability of application developers to develop applications may present issues related to maintaining the proper operation of the ATM. The ability of third party developers unassociated with an ATM manufacturer to write software that can be loaded onto and operate the ATM may present issues as to whether the software loaded on the ATM is authorized as well as whether such a developer has met commitments that they may have related to the manufacturer or other third parties.

A further issue may arise with regard to entities that wish to operate devices in conjunction with an automated teller machine that are not devices for which standard service provider interfaces have been developed and/or devices which require different relationships to other ATM transaction function devices than a device normally associated with such a service provider interface. In such cases it may not be cost effective for an ATM manufacturer to develop or support service provider software for devices that are not normally included in an automated teller machine. As a result the capabilities of automated teller machines to work in conjunction with such external devices may not be developed.

Further issues may arise when software components provided by different entities are installed on an ATM. Uncertainty may arise as to which software component (or transaction function device) is the cause of a malfunction of the ATM.

DISCLOSURE OF INVENTION

There exists a need for a system and method for facilitating the distribution of software for operating automated teller machines and which will make software more readily available to owners of automated teller machines and developers who wish to have a single software application that runs automated teller machines of different manufacturers. There further exists a need for a system and method for assuring that software which has been developed and/or modified by third parties, or that has been installed on ATMs is authorized by the manufacturer of the ATM or other authorizing entity. There further exists a need for assuring that third parties who develop or modify ATM software abide by commitments that they had made to the ATM manufacture, other authorizing entity or the user community in general. There further exists a need for verifying that multiple software components from different sources are authorized to work together on an ATM, and for more readily identifying the source of a malfunction. There further exists a need for a system and method for supporting devices that are not traditionally included in ATMs as adjunct devices to ATMs and to assure that such adjunct devices are authorized and supported.

It is an object of an exemplary embodiment of the present invention to provide a method.

It is a further object of an exemplary embodiment of the present invention to provide a method of distributing automated teller machine software.

It is a further object of an exemplary embodiment of the present invention to provide a method of distributing automated teller machine software that will enhance the ability of owners of automated teller machines to use software that can be run on automated teller machines produced by different manufacturers.

It is a further object of an exemplary embodiment of the present invention to provide a method in which advancements in automated teller machine software are shared with the market so as to improve the quality of automated teller machine software.

It is a further object of an exemplary embodiment of the present invention to provide a method for distributing automated teller machine software that preserves heightened security for systems including automated teller machines.

It is a further object of an exemplary embodiment of the present invention to provide an automated teller machine that is operative to verify that software installed thereon has been authorized by an entity associated with the machine.

It is a further object of an exemplary embodiment to provide an automated teller machine which operates to more readily identify the source of malfunctions.

It is a further object of an exemplary embodiment of the present invention to provide an automated teller machine and system that is operative to verify that a plurality of software components installed on an automated machine have been indicated as suitable for operation together.

It is a further object of an exemplary embodiment of the present invention to provide an automated teller machine and method which enables the machine to work in conjunction with an external device not generally operated in an automated teller machine.

Further objects of exemplary embodiments of the present invention will be made apparent in the following Best Modes for Carrying Out Invention and the appended claims.

The foregoing objects are accomplished in a first exemplary embodiment by a method in which an entity develops a hardware independent software application for operating automated teller machines of different manufacturers. This may include for example, a software application that complies with the XFS or other standard. In accordance with the first exemplary method, the entity developing the application then offers to provide the right to use the software to all owners of automated teller machines regardless of brand at no charge.

In accordance with an exemplary form of the method, the entity originally developing the software application authorizes third parties, such as automated teller machine owners or software developers or others, to modify and/or distribute the original and modified forms of the software. The right to modify and/or distribute the software is offered in exchange for such third party's agreement to provide the source code for such modified software to the entity offering the application. The entity offering the application may then further make the modified forms of the software available in the same manner as the original application. In an exemplary embodiment to further assure that the third parties modifying the software make their modifications available, a condition to granting the rights to modify the software includes an obligation to make available the source code for such modified software to any third party upon request.

In some exemplary embodiments in order to assure security of automated teller machine systems, the requirement to provide modifications to the entity originally offering the application and/or to third parties, may be restricted with regard to security software modifications. Such security software modifications may include modifications as may be specifically defined by agreement, but would normally include only those modifications which if provided and made publicly available may facilitate the compromise of security of an automated teller machine system. In some exemplary embodiments such security software modifications may not necessarily include techniques which rely on specific keys, certificates or other electronic security features which provide security independent from the software itself and which are unique to the particular user. In one exemplary embodiment however, for security software modifications that are not contributed to the application provider for redistribution to third parties, the entity making such modifications is required to provide a general description of the security modifications made and the name of each entity to which the modified software has been provided. The entity offering the application would then make this information publicly available so that it could be found by third parties.

In addition or in the alternative, exemplary embodiments may require a party making security software modifications that are not contributed to the generally available application, to make the source code for such security modifications available to any user who has received the code or any person or entity that such a user has designated as their agent for receiving the code. This may include for example another developer which a user of such a system wishes to have further modify the software. Of course the obligations to contribute modifications and make available further security software modifications would apply to any subsequent modifications of the code.

In other exemplary embodiments entities requiring modifications to the software application are urged through technological measures to provide the modified forms of the software to the entity offering the original form of the software. This may be done for example, by including in the automated teller machine at least one software verification device that is operative to verify that a copy of the software installed on the machine has been provided to the entity. The software verification device may operate for example, by verifying one or more verification features that are included in the software application by the entity offering the original code after the third party had provided it to the entity. This may include for example, the third party providing the modified software to the entity, and the entity including verification features in the software such as a digital signature, and the entity then providing the software with the digital signature back to the developer or other entity who produced the modified version. In such a system the software verification device in the ATM may operate to read and analyze the digital signature included in the software after it is installed to verify that the signature is a valid signature of the authorizing entity.

In some alternative exemplary embodiments the ATM may include a software verification device that is operative to communicate with a remote computer operated under the auspices of the entity offering the software. In such systems remote communication caused through operation of the software verification device, between the machine and the remote computer is operative to determine that the software installed in the machine has been provided to the entity. This may be done for example, by comparing identifying features of the software in the machine with such features of software deposited with the entity. Such identifying features may include a hash of all or a portion of the software and/or comparing the magnitude of measurable parameters associated with the software and/or other features or combinations thereof. Such communication between the ATM and the remote computer associated with the entity is operative to determine at least one result indicative of the relationship between the identifying features which establishes whether the software has been provided to the entity and which is used by the machine as the basis for allowing or preventing the software from operating at least one device of the machine.

In other exemplary embodiments the principles described may be used to verify that software that is not made generally available for distribution and modification, is authorized by the manufacturer, licensor or other entity associated with the machine. This may include for example situations where an ATM manufacturer, an ATM operator such as a financial institution or other third party commissions an independent developer to produce software to operate an ATM. At least one software verification device may operate in the ATM to verify that the software which has been installed therein is the software that has been provided to or otherwise authorized by the entity. Such approaches may help to assure that independent developers or other third parties do not provide or install unauthorized software on ATMs. As can be appreciated, a requirement that the entity has received the software and in some manner authorized its use before the software will operate on the ATM to carry out at least one type of transaction function minimizes the risk of the use of unauthorized software.

In other exemplary embodiments the principles described herein may be used to facilitate the development of systems in which other devices not normally operated in automated teller machines are nonetheless used as an adjunct thereto. Such adjunct devices may include for example, specialized money order, check or ticket printers which provide special authentication or other types of features on items that they produce. Other devices may include ticket acceptors or token return devices which have special requirements not normally associated with financial transactions. Other devices may include for example, devices which provide goods or services of value such as for example, article rental devices which enable the user to rent or operate an article for a period of time through payment made through the ATM. Other examples may include devices which deliver various types of digital media such as video, music, text or other items. Other examples of devices may include tanning devices, aroma therapy devices, medication dispensing devices, oxygen delivery devices, beverage dispensing devices and other types of devices for which there is an associated financial transaction that can be conducted through a connected ATM.

In some exemplary embodiments entities such as the ATM manufacturer or other entity, may provide the source code of its service provider software to third parties and grant the right to make modifications thereto. Such third parties may develop modified forms of the service provider software so as to enable the support of specialized devices which are not normally included in the ATM. Such specialized device support may facilitate the development and support for such adjunct external devices which the ATM manufacturer may not otherwise support. To assure that the modified forms of the service provider software are suitable, some exemplary embodiments may require that such modified forms of the software be authorized by the entity such as the manufacturer of a machine. This enables the manufacturer of the machine or other entity to certify that the modified form of the software is appropriately suitable for operation in the machine and in the other associated device.

In some further exemplary embodiments multiple items of computer software may be installed in the ATM. In such exemplary embodiments the software verification device may operate to determine that all of such plurality of software items are authorized for operation on the machine by the entity. In addition, the machine may operate to verify that the plurality of software items that are installed on the machine are compatible or otherwise authorized for use together on the machine. Such capabilities are provided so that the machine will not operate absent a determination that the items are authorized and suitable for use together. Other exemplary embodiments may include software components which operate independently to test the functionality of the component independently of other software components and/or devices. This may facilitate the identification of a malfunctioning software or hardware component from among a plurality of components that are interdependent in their normal operation. Of course it should be understood that these features and approaches are exemplary and in other features and embodiments other approaches may be used.

The descriptions provided herein are exemplary and all other devices, methods and systems encompassed by any of the claims below are within the scope of the present invention.

BEST MODES FOR CARRYING OUT INVENTION

Figure 1:
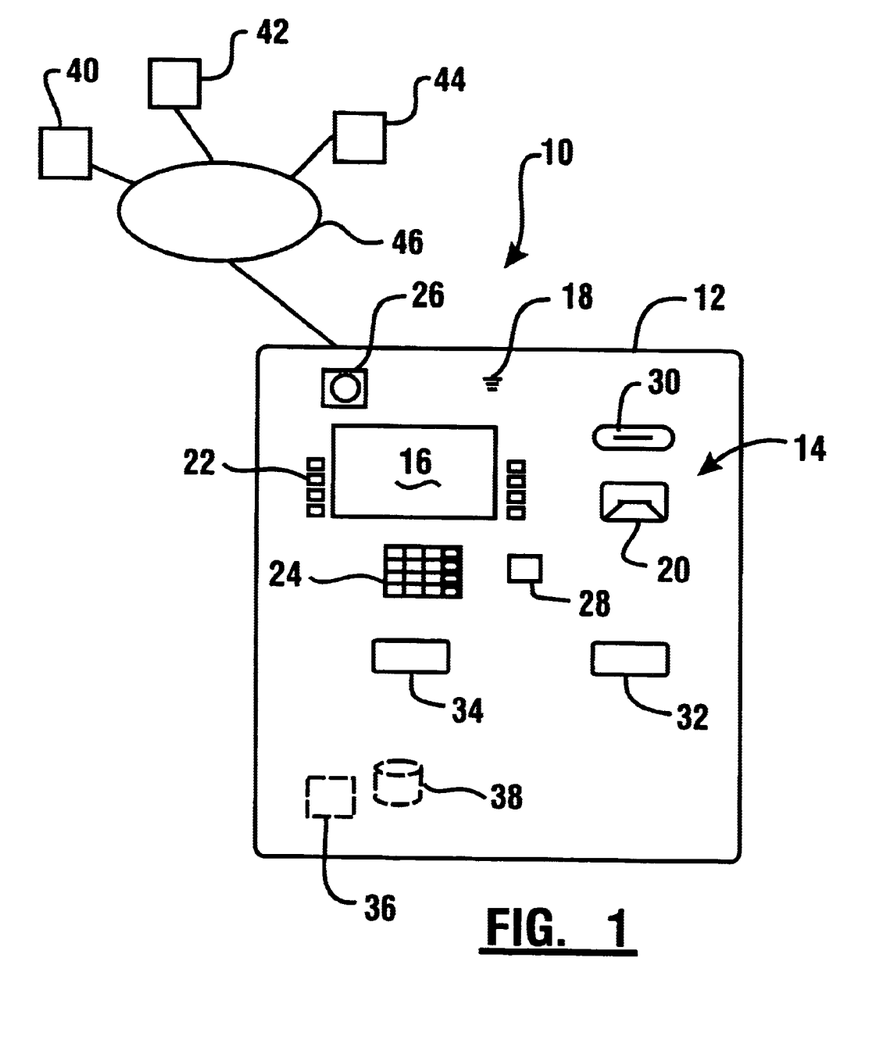
FIG. 1 is a schematic view of an automated teller machine system which may be used to carry out transactions.

Referring now to the drawings and particularly FIG. 1, there is shown therein an automated teller machine system generally indicated 10. The system includes an automated teller machine 12. Automated teller machine 12 is alternatively referred to herein as an ATM. Automated teller machine 12 of the exemplary embodiment is used by consumers to carry out banking transactions. The exemplary ATM 12 is shown as including thereon a user interface generally indicated 14. User interface 14 includes one or more input devices and output devices. Input devices may be used by the operator of the machine to provide information or instructions to the machine. Output devices include devices for providing information and instructions to a user. In this exemplary embodiment user interface 14 includes an output screen 16 which serves an output device. User interface 14 of the exemplary embodiment further includes a speaker schematically indicated 18 for providing audible outputs to a user.

User interface 14 further includes a card reader schematically indicated 20. The card reader in the exemplary embodiment is operative to read cards or other articles provided to the machine by a user which may include information which identifies the user, a user's account or other information. User interface 14 further includes function keys 22. Function keys 22 are positioned adjacent to screen 16 and enable a user to select options which may be presented to the user visually through the screen. A further input device in the exemplary embodiment includes a keypad 24. In this exemplary embodiment keypad 24 includes an alphanumeric keypad as well as certain function keys.

The exemplary embodiment also includes an image capture device 26. Image capture device 26 may be operative to capture images of portions of a user. This may include for example capturing images of the user's face for purposes of making a record of the transaction. Alternatively images of a user's face may be analyzed and used for purposes of identifying the user. In alternative embodiments the image capture device may comprise an iris scanner or other biometric reader for purposes of identifying a particular user carrying out a transaction. Other input devices may also be provided on user interface 14. For example a fingerprint reading device 28 is schematically represented. Fingerprint reading devices may be used in some embodiments to read fingerprint data from a user for purposes of identifying a user. It should be understood that fingerprint data, iris scan data or other biometric data may be used in some embodiments as an alternative or additional means for identifying the user. Such means may be used as a substitute for or as a check on data provided by a user to a card reader or other method for purposes of verifying the user's identity or accounts.

The exemplary ATM 12 further includes in its user interface, a receipt printer 30. In the exemplary embodiment receipt printer 30 is operative to provide users with receipts or other data related to transactions which are conducted at the machine. It should be understood that in other embodiments different or additional types of output devices may be provided including printers that provide users with statements or other documents.

The exemplary ATM 12 further includes a cash dispenser schematically indicated 32. The exemplary cash dispenser is operative to dispense cash in the form of bills or currency notes to a user who conducts a dispensing transaction. The exemplary ATM 12 further includes a depository schematically indicated 34. Depository 34 in the exemplary embodiment is operative to accept deposits input by a user in the course of certain types of transactions conducted at the machine.

It should be understood that the devices discussed in connection with ATM 12 are exemplary. In other embodiments of ATMs, different types and numbers of devices may be used. The type and character of the devices may depend on the particular type of ATM being operated and the character of the transaction types to be conducted.

As schematically represented in FIG. 1, ATM 12 includes therein at least one processor 36. Processor 36 is in operative connection with at least one data store schematically indicated 38. The devices included in ATM 12 are operated responsive to instructions carried out by the processor in accordance with computer software and data stored in the data store 38. The discussion of an exemplary automated teller machine, components and the operation thereof are included in U.S. Pat. No. 6,334,117 granted Dec. 25, 2001 and owned by the assignee of the present invention, which patent is incorporated herein by reference in its entirety as if fully rewritten herein. As can be appreciated the data store includes software instructions and data that can be executed and/or utilized by the at least one processor in the machine to cause the machine to operate to carry out transactions for users of the machine. Software which includes the instructions may reside on and/or be loaded into the data store from articles such as floppy disks, CDs, hard drives, memory cartridges, tape or other types of articles or media capable of holding such instructions.

ATM 12 is operative to carry out transactions for users through communication with remote computers schematically indicated 40, 42 and 44. ATM 12 includes at least one communication device such as a modem or other network interface device to enable such communication. The remote computers communicate with ATM 12 through at least one network 46. The remote computers may be associated with financial institutions, sources of monetary value or other entities that can authorize the conduct of transactions by a user at the machine. Messages exchanged between the ATM 12 and the remote computers are operative to provide a remote computer which can authorize a transaction, with information concerning the requested transaction. This may include for example, the type of transaction, amount involved and the account or user requesting the transaction. When the remote computer receives the information necessary to determine if the transaction should be authorized, the remote computer operates in accordance with its programming to determine if the transaction should be authorized.

The remote computer then sends one or more messages through the network to indicate to the ATM 12 if the transaction should be carried out. In response to an indication that the transaction is authorized the ATM will operate responsive to the processor 36 to operate the transaction function devices and to complete the transaction. In the exemplary embodiment the processor then causes the ATM 12 to communicate with the remote computer which authorized the transaction to indicate that the transaction was completed or was not successfully completed. The remote computer in response to the message from the ATM may make the necessary deductions or additions from accounts, record information or otherwise appropriately account for the transactions conducted.

Figure 2:
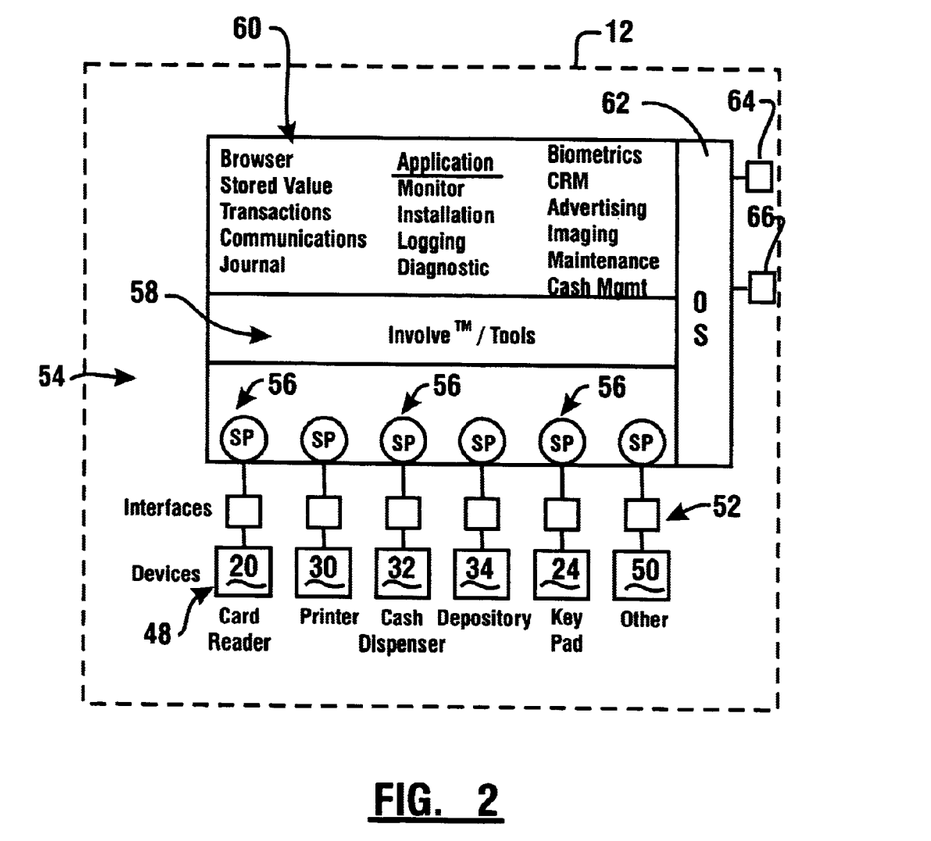
FIG. 2 is a schematic view of hardware and software components in an exemplary automated teller machine.

FIG. 2 is a schematic representation of some of the hardware and software included in ATM 12. As previously discussed ATM 12 includes transaction function devices generally referred to schematically as 48. The transaction function devices may include the devices previously discussed, only some of which are shown. These include for example the card reader 20, printer 30, cash dispenser 32, depository 34, keypad 24. Other or additional transaction function devices are represented schematically by the device 50. It should be understood that device 50 actually represents multiple items of transaction function device hardware, and that all transaction function device hardware components are not shown herein for purposes of simplicity.

As represented in FIG. 2, the hardware of each transaction function device generally has an associated software interface. These interfaces are schematically indicated 52. In some exemplary embodiments the interfaces 52 comprise firmware which is resident on processors associated with the respective transaction function device. It should be understood that the nature of the interface and its character as either hardware or software will depend on the particular transaction function device with which it is associated.

An exemplary software environment operating in processor 36 is schematically represented 54. Software environment 54 includes a plurality of service provider software or SPs indicated as SP software 56. As previously discussed the exemplary service provider software is operative to generally present an interface for each particular device that conforms to the requirements of the standard for the particular type of device. Thus, for example the service provider software associated with the cash dispenser presents an interface that enables the SP software to cause the cash dispenser of the particular brand and type of ATM to operate in response to commands that have been established as those which should cause a cash dispenser in an ATM to operate. The SP software 56 in the exemplary embodiment is operative to cause operation of the transaction function devices as well as to control certain relationships between such devices so as to avoid the need to account for such relationships in other software components. It should be understood that this approach is exemplary and in other embodiments the programming regarding relationships between devices may be included in other software layers as appropriate in accordance with the particular standards to which the software is written. Further, as later discussed additional software may be provided such as verification software which is operative to reduce the risk that unauthorized software is allowed to operate transaction function devices in the ATM.

In the exemplary embodiment of the software environment 54, a middle layer 58 is used. In the exemplary embodiment the middle layer includes INvolve™ software which is available from Nexus Software, Inc. of Raleigh, N.C. In alternative embodiments the middle layer may include APTRA™ software available from NCR Corporation or other middle layer software. The middle layer software is alternatively referred to herein as "middleware." In the exemplary embodiment the middle layer software is operative to account for any differences or special circumstances that may exist which may make the service provider software and associated commands different for different brands of hardware. For example the recognized standards for automated teller machine devices may not account for all of the features or functions available in a given transaction function device. Standards often leave open the opportunity for additional instructions or messages to accommodate such devices. Further, as later discussed certain machines may include or have operated in connection therewith devices for which there is no applicable published standard.

Exemplary middle layer 58 includes software which is operative to cause operation of at least some transaction function devices and to handle differences between various types of service provider software so as to avoid the need for the developer of the application to have knowledge of and/or to account for them. In addition the exemplary form of the middle layer 58 may include tools or other devices that may be useful in the operation of the automated teller machine. This may include for example features such as data compression to facilitate the printing of graphics on forms. The middle layer may also include software that deals with particular service or diagnostic functions. It should be understood that the middle layer 58 discussed herein is exemplary and in other embodiments different properties of the middle layer may be provided or alternatively no middle layer may be used.

In exemplary software environment 54 application software 60 is provided. In the exemplary embodiment application software 60 is a hardware independent software application which is suitable for operating ATMs of different manufacturers. Such ATMs may include for example ATMs manufactured by Diebold, Incorporated, NCR Corporation, Fujitsu or Wincor-Nixdorf or other manufacturers. The exemplary application software 60 includes software which is operative to cause the transaction function devices to carry out functions which are required for operation of the automated teller machine. The application also provides and receives instructions in accordance with the standards that enable the operation of ATM devices and/or the middle layer 58.

Exemplary functions provided by the application may include a browser for the processing of markup language documents. The application may include the functionality of providing the instructions to the other software layers for handling stored value transactions such as moving money between electronic purse devices such as smart cards. The application may include the functionality for delivering the messages to and receiving responses from other software components which causes the processor to carry out the various transactions associated with the ATM machine. These transactions may include the dispense of cash, the receipt of deposits or other functionality provided through the machine. Other aspects of the application may include certain security and communications features and/or features for carrying out the installation of the software, the configuration thereof as well as transaction login and diagnostic features. Other exemplary features may include maintaining a journal of transactions conducted, the capability for monitoring the operation of the ATM remotely. Other functions which may be included in the application software may include certain biometric analysis or reading capabilities as well as capabilities for providing customer relationship management and advertising. Other functions may include aspects associated with imaging of documents such as checks, providing maintenance and testing functions for monitoring operation or for purposes of managing cash which may be dispensed from or received by the machine. It should be understood that these functions supported by the hardware independent software application are exemplary and in other embodiments lesser numbers, greater numbers, other or different functions may be provided.

The exemplary software environment 54 also includes an operating system schematically indicated 62. The operating system may comprise Windows software available from Microsoft® Linux or other suitable operating system software. As represented by devices 64 and 66, other devices in the ATM may be operative to communicate with the software environment and such devices are not operated through the use of service provider software. Such devices may include for example communication devices, and other devices for which operative capability is provided by the functions included in the operating system, or in the middle layer.

It should be understood that the arrangement of software components shown in FIG. 2 is exemplary and in other embodiments other arrangements may be used.

Figure 3:
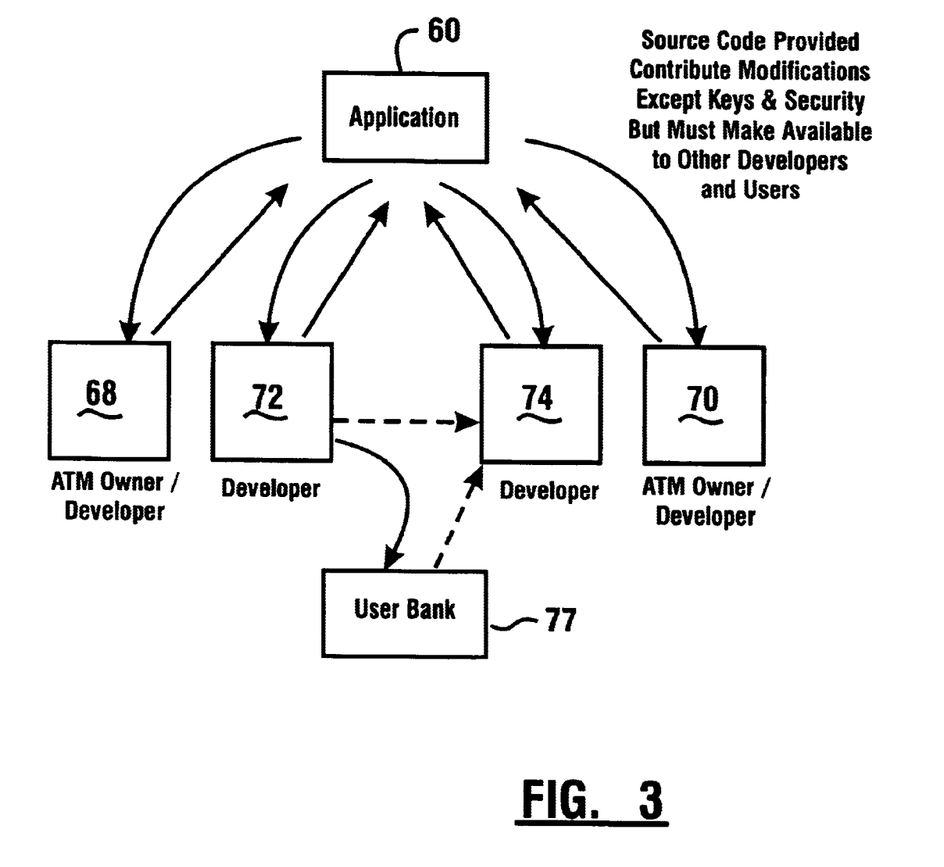
FIG. 3 is a schematic view of a diagram representative of the distribution of software in an accordance with an exemplary embodiment.

In accordance with a first exemplary method, the development and use of hardware independent software applications for automated teller machines is made generally available to appropriate users at no charge. The distribution of such software is schematically represented in FIG. 3. It should be understood that for purposes of this disclosure "no charge" does not necessarily mean absolutely free, but rather may include an amount charged that is substantially less than the reasonable value of the particular item.

As schematically represented in FIG. 3, in accordance with an exemplary method, application software 60 is offered by an entity to owners of ATMs, developers and others for no charge. For example the entity that is the original developer of the application 60 offers to grant rights to use the application to all owners of ATMs at no charge. Such owners of ATMs are schematically represented 68 and

70 in FIG. 3. In accordance with the exemplary embodiment, the application is also offered to third parties including developers and ATM owners with the right to modify the application at no charge. Such developers that are not ATM owners are schematically represented 72 and 74 in FIG. 3. In this exemplary embodiment the offer to ATM owners, third party developers and others to use and modify the application at no charge is contingent upon such entities giving the entity originally offering the application 60, such modifications and associated rights to use, modify, display, perform, copy and distribute the modifications and modified forms of the application at no charge. The entity providing the application is also returned the modified forms of the source code along with all associated rights necessary to utilize or provide such modified version to third parties. In the exemplary embodiment the entity originally providing the application may be associated with the ATMs. It may be for example, the manufacturer of the ATMs. Alternatively, in other embodiments the entity offering the application may be a particular operator of ATMs such as a financial institution. Of course, in other embodiments, other entities may be the original provider of the application.

In this exemplary embodiment third parties are also offered the right to distribute the application including modified versions thereof at no charge. However, again such modifications including source code and the associated rights, must be provided to the entity originally offering the application. In addition such modifications also must be provided in the exemplary embodiment in source code form along with the associated rights to any third party upon request. In accordance with the exemplary embodiment the modified forms of the application 60 are again made available by the entity originally offering to provide the software. The obligations of entities to provide any modified forms of the application to the entity originally offering the application as well as to third parties, may be made enforceable in some embodiments in accordance with a license agreement to which parties who receive the application either directly or indirectly are required to be bound. Alternatively, or in addition, technological measures may be used as hereafter discussed.

In accordance with an exemplary method, the use of the hardware independent software application is encouraged. Further improvements and other functions that may be produced are made available to others. In addition the availability of the software facilitates the capability of having a software application that runs appropriately on ATM hardware of any brand which an ATM user may desire to operate. This results in the ATM user being able to use their modified form of the software application on any or all of the ATMs that they may choose to purchase from any manufacturer without incurring charges associated with acquisition of the software application other than those charges that may be associated with modifications the user cares to make or have made.

In some exemplary embodiments in order to enhance security, ATM owners or developers may develop security software modifications which if generally publicly disclosed could place the security of automated teller machine systems at risk. Such security software modifications would include modifications specific to a particular user's system which provide that user with enhanced security. In some exemplary embodiments such security software modifications would not be required to be provided to the entity originally offering the application software or to other entities absent certain circumstances. It should be understood however that it is contemplated that in some exemplary embodiments, security software modifications that rely for security primarily on keys, certificates or other separate elements that are unique and which maintain the secure nature of the operation of the software application even if the methodology of operation becomes known, will not be exempt from the requirement of providing the modified source code to the entity originally offering the application and/or to third parties.

In order to avoid certain developers from producing forms of the application software which are not generally available by declaring them to include security software modifications, some exemplary embodiments may impose upon persons modifying the application to comply with certain contractual requirements. Such requirements may include for example a requirement for providing to the entity originally offering the application an indication that such security modifications have been made and/or a non-confidential description of such security modifications. In addition or in the alternative, an entity making such security software modifications may be required in some embodiments to provide to the entity offering the application the name, address and/or other information concerning each entity that has received software including such security software modifications.

In some exemplary embodiments contractual restrictions are imposed such that an entity that has produced security software modifications is contractually obligated to provide such security software modifications including the source code therefor, to any entity who has received software including such modifications legally, as well as to any entity such as a third party developer who requests such modifications on behalf of an entity who operates a system which includes such modifications. This is schematically represented in FIG. 3 by user bank 77. User bank 77 may have originally received a modified form of the hardware independent application software from developer 72. The modified form of the application may include security software modifications. In accordance with an exemplary method the developer 72 must inform the entity originally offering the application that such security software modifications have been made, the nature of such modifications and information indicating that software including such modifications has been provided to the user bank. If at a later date the user bank 77 wishes to acquire the source code for such security modifications, the developer 72 is required to provide it. In addition or in the alternative, if user bank 77 wishes to retain developer 74 to modify the software application being used by user bank 77, developer 72 upon receipt of appropriate information indicating that developer 74 has been authorized by user bank 77 to receive the security modifications, developer 72 is required to provide them.

In this way the hardware independent software application is prevented in some embodiments from being used to develop proprietary forms of the software. As can be appreciated in this exemplary embodiment restrictions and obligations related to use and distribution of the application are made applicable as appropriate to all who subsequently use and receive it. Of course as with security modifications, in some embodiments other limitations and restrictions may be applicable. It should be understood that the particular system and method shown are exemplary and in other embodiments other approaches may be used.

Figure 4:
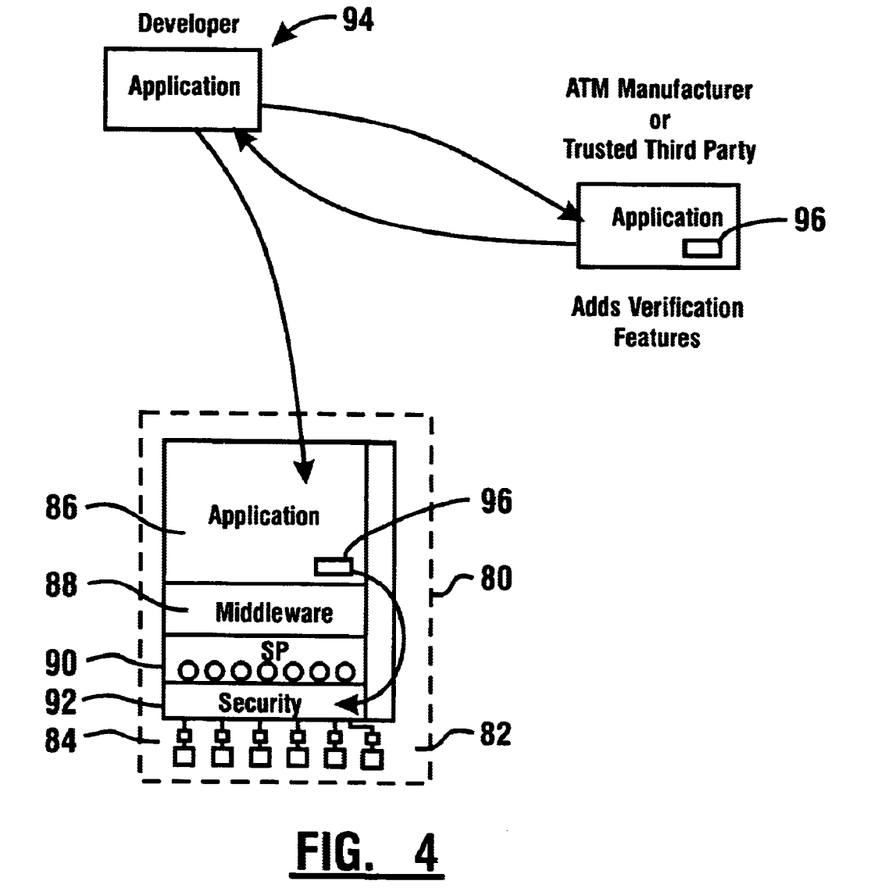
FIG. 4 is a schematic view representative of a methodology in which an entity receives ATM software and assures that the software is authorized by the entity through inclusion of verification features in the software.

In some embodiments technological measures may be used to assure than an entity originally offering application software is provided with the modifications thereto made by third parties. An exemplary system for assuring this is represented in FIG. 4. FIG. 4 shows an exemplary ATM 80.

ATM 80 is generally similar to ATM 12 except as specifically discussed. ATM 80 includes transaction function devices schematically represented 82 of the type previously discussed. Transaction function devices 82 are operated through interfaces 84. ATM 80 further includes software components that operate in the at least one processor of the ATM, including application software 86, middleware software 88 and service provider software 90.

Exemplary ATM 80 further includes a security software layer schematically represented 92. It should be understood however, that although in the exemplary embodiment the security software layer is shown as software, in some embodiments the functions discussed in connection with the security software may be performed by firmware or hardware devices or a combination of hardware, firmware and/or software. Exemplary security software operates in conjunction with the at least one processor and serves as a software verification device. The software verification device serves to assure that at least some of the software components installed on the ATM 80 have been authorized by at least one entity that is associated with the machine. This may be for example, the ATM manufacturer who is entitled to receive all modified forms of the software application which the manufacturer has made available for distribution. Alternatively, the authorizing entity may be another entity such as a trusted third party operating at the direction of the ATM manufacturer or another third party such as a financial institution operating ATMs. In some embodiments there may be multiple authorizing entities for a single software component, or multiple authorizing entities each associated with different software components that are installed on the machine.

As schematically represented in FIG. 4 prior to operation on the ATM 80, a developer creates an application or a modified form of the generally available application which developer is schematically represented 94. In an exemplary embodiment the developer provides the application to the ATM manufacturer, trusted third party or other authorizing entity for purposes of including one or more verification features schematically indicated 96 with the application. These verification features may include features that can be verified through operation of the software verification device as authorized by the entity. The ATM 80 may verify that once the application has been installed it is authorized by the entity. It is only after the software verification device is determined to be authorized by the entity, does the verification device allow the software component to cause the operation of one or more transaction function devices of the ATM. This may include for example, preventing the software component that is determined as not authorized from causing operation of a cash dispenser under any circumstances. Alternatively, the determination that a software component is not authorized may prevent operation of one or more transaction function devices responsive to the software component only under certain circumstances or for particular transactions. The approach taken may vary depending on the nature of the software component and security device.

Verification features included in software components may include, for example, a digital signature produced responsive to the application. Such digital signatures may be comprised of a hash of all or portions of the application, may be based on certain measurable parameters of the application, or other features or combinations thereof, which can be used to document the authenticity of the verification features. For example, the verification features may be included in the application by the entity such that when analyzed by the software verification device under the circumstances in which the application has been installed in the ATM 80, the verification features will produce a particular result that is indicative that the application has been authorized by the entity. The software verification device will generally operate to prevent the application from causing the operation of one or more transaction function devices unless the verification features are determined by the software verification device as indicating that the application has been authorized by the appropriate one or more authorizing entities. In the exemplary embodiment if the software is not determined to be authorized, even though it may be installed on the ATM and may run to at least some extent, the security device prevents at least one transaction device from operating responsive to that software component under at least some circumstances.

As can be appreciated in exemplary embodiments the approach schematically represented in FIG. 4 assures that modified forms of the application are made available to the entity such as the ATM manufacturer who is entitled to receive the modified form of the software. In addition or in the alternative, aspects of the approach represented in FIG. 4 may be used to assure that software applications installed on an ATM are appropriately authorized such as by having been licensed by the ATM manufacturer or other entity. In addition or in the alternative the approach represented may assure that the software which operates on an ATM has been tested and certified by the entity as working appropriately on the ATM or the type of ATM on which it has been installed. Such approaches may be used in circumstances where software is not made generally available, to assure appropriate licensing and to avoid the operation of the machine by unreliable and possibly fraudulent software. It should further be understood that although the approach schematically represented in FIG. 4 is described in reference application software, in other embodiments similar approaches may be used with other software components on the ATM.

Figure 5:
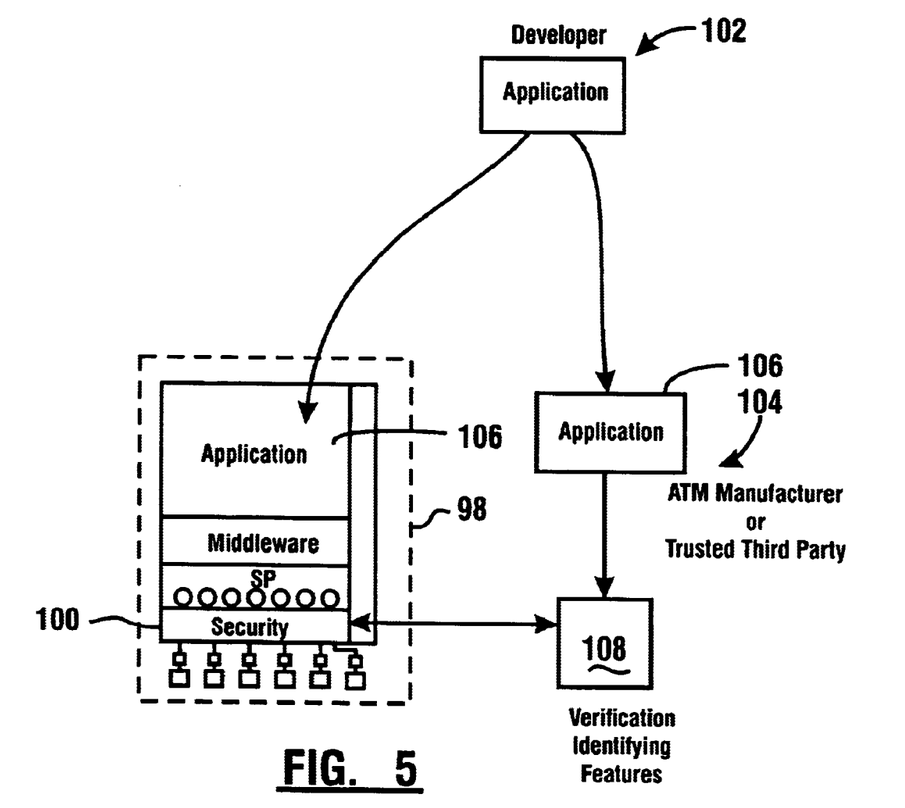
FIG. 5 is a schematic view of a methodology in which an entity assures receipt and authorizes software by verifying identifying features included in the software.

FIG. 5 schematically represents an alternative approach for assuring that software that operates on an ATM has been authorized by an appropriate entity. Exemplary ATM 98 shown as FIG. 5 is generally similar to ATMS 80 and 12 previously discussed, ATM 98 further includes security software 100 which is part of a security device and operates to prevent at least one other software component from operating at least one transaction function device unless the software component is determined by the security device to have been authorized by an authorizing entity.

In the embodiment schematically represented in FIG. 5, application software that has been produced or modified by a developer schematically represented 102, is required to be provided to an entity 104 which in some exemplary embodiments may be an entity associated with the ATM manufacturer or other third party as previously discussed. However, the exemplary approach represented in FIG. 5 does not require the application developer to provide the application to the entity for inclusion of the entity's verification features prior to distribution of the application and installation on ATM 98. Rather, in the exemplary embodiment represented in FIG. 5, the software is provided to the authorizing entity and is also installed in the ATM. The authorizing entity 104 is associated with a remote computer 108 that is enabled to be in operative connection with the ATM 98 through a communication device. Remote computer 108 includes the application and/or instructions or other data corresponding to the application 106 in an associated data store. In this exemplary embodiment the software verification device in the ATM is operative to analyze identifying features associated with the application 106. Further the software verification device is operative to cause the ATM 98 to verify through communication with the remote computer 108 that the identifying features associated with the application 106, correspond with identifying features associated with the application 106 available at the remote computer. Such identifying features may include for example, a hash of all or a portion of the application, one or more measured parameters associated with the application, combinations thereof or other features which can be calculated or measured by the software verification device in the ATM and/or the remote computer 108 for purposes of verifying that such features have a relationship which is representative that software applications correspond.

As can be appreciated for example, the software verification device in the ATM may operate to cause the ATM to resolve one or more verification features and communicate data corresponding to such features with the remote computer 108. The remote computer 108 may also resolve corresponding verification features and determine through such communication whether such verification features as resolved by the ATM and the remote computer have an appropriate relationship so as to indicate that the software on the ATM is authorized. As can be appreciated, the communication between the ATM and the remote computer may involve appropriate encryption techniques and techniques for secure communication so as to minimize the risk of interception of the communications by unauthorized persons. As can also be appreciated various approaches may be used in embodiments to resolve and verify that there are appropriate relationships between identifying features in the application at the ATM and provided to the entity, and to reduce the risk that sensitive information will be intercepted.

The approach represented in FIG. 5 assures that the authorizing entity has received the application. This approach may be used in situations where the application is made generally available to some or all users, as well as in situations to assure appropriate licensing or certification of the application. It should further be understood that the approach represented in FIG. 5 may be used in conjunction with other types of ATM software other than the application.

In some embodiments the approach represented in FIG. 4 may also be used in conjunction with the approach in FIG. 5. For example, some ATM software components may include verification features which may be verified by the software verification device in the ATM without communication to a remote computer. Other software components may be verified through identifying features verified through such remote communication. Alternatively or in addition, the same ATM software components may include both verification features which can be validated locally as well as identifying features that can be validated through remote communication. Of course, in alternative embodiments other approaches may be used.

Figure 6:
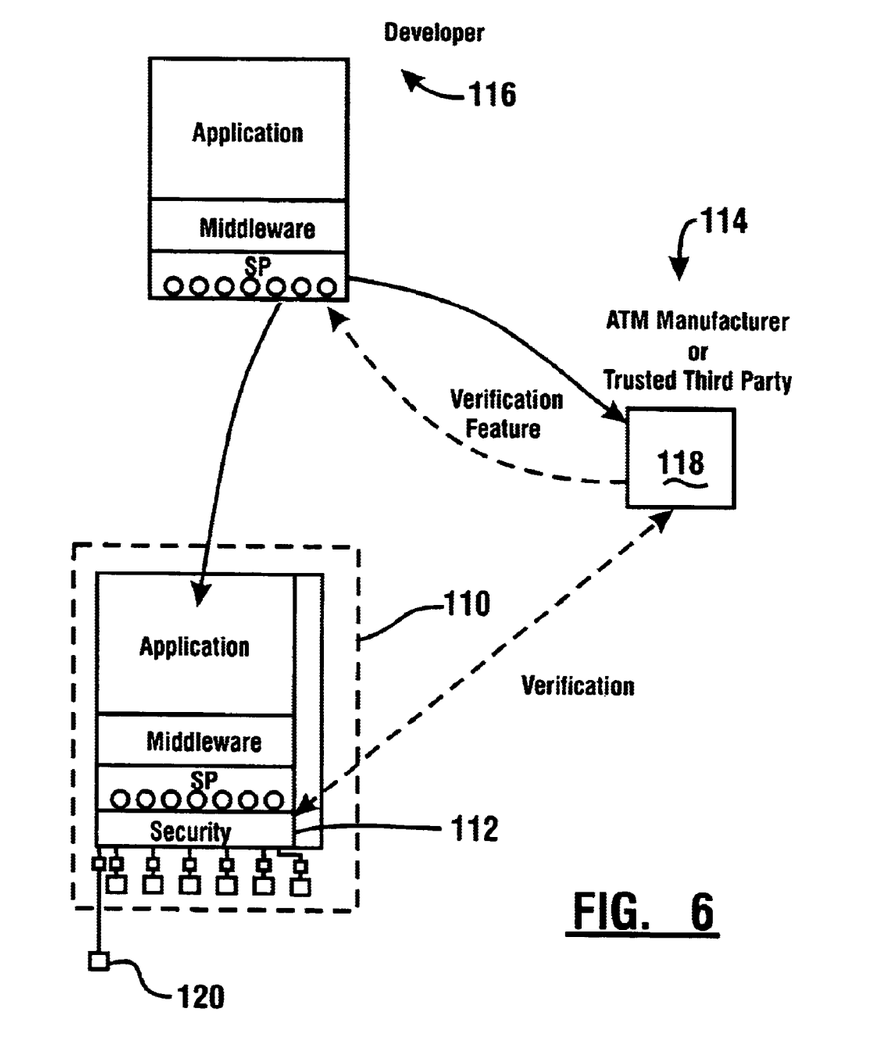
FIG. 6 is a schematic view of a further alternative methodology which multiple software items are authorized for use on an ATM.

A further alternative approach is represented schematically in FIG. 6. In this alternative an ATM 110 includes software of the type previously discussed including security software 112 which serves as part of a software verification device. As in other embodiments, the embodiment represented in FIG. 6 is intended to enable operation of a software component on the ATM 110 only when the software component has been authorized by an authorizing entity referred to as 114.

In this exemplary embodiment a developer referred to as 116 is authorized to develop a plurality of software components. The software components may include for example, an application, middleware and service provider software as shown. Alternatively, the developer may provide modified forms of some or all of such items. As schematically represented in FIG. 6 the plurality of software components developed to be installed on the ATM may be provided to the entity 114 for purposes of providing verification features therein. Such verification features may include for example, one or more digital signatures based on features of some or all of the software components. In such cases the software verification device in the ATM 110 may operate to prevent the operation of one or more transaction function devices responsive to the software component unless the verification features are verified as indicating that the software is authorized by the entity.

Alternatively or in addition as represented in FIG. 6, a remote computer 118 associated with the authorizing entity may include the software component or instructions or data corresponding thereto, in operative connection therewith and may operate to resolve identifying features associated with such software. Through communication with the ATM responsive to the software verification device the remote computer and the software verification device may determine that the software installed on the ATM is authorized. This may be done through the resolution of identifying features and communication between the ATM and the remote computer in a manner previously discussed.

Each approach represented serves to assure that the multiple software components that have been developed or modified by the developer 116 have been provided to and/or authorized by the entity 114. In some embodiments the authorization may be associated with the entity having certified the software for proper operation, the software having been properly licensed or some other aspect of the software having been analyzed or certified for purposes of assuring that its operation on the ATM 110 is appropriate.

The approach schematically represented in FIG. 6 may be useful in situations where persons wish to obtain support for conducting transactions through an ATM that involves devices that are not normally associated with ATMs. Such devices may include for example, an external device schematically represented 120 that is not normally found in an ATM, but which may be operated in conjunction with an ATM. This may include, a device which may be operated in conjunction with a particular financial transaction that may be carried out by the ATM. As a result the ATM application may accommodate the carrying out of such a transaction in combination with the operation of other transaction function devices. Such external devices may include devices mounted in an adjacent cabinet or other apparatus or may be remotely connected to the ATM. For example, such devices may include printers of checks, money orders or tickets which incorporate features not generally associated with printers found in ATMs. Other exemplary devices may include devices for accepting tickets, tokens or other items which may be redeemed for value. Alternative devices may include for example, an article rental device which provides the capability for an ATM user to rent or use a particular item for a period of time. For example, this may include a device which enables a person to rent a vehicle and to utilize the vehicle for a period of time. Alterative devices may include a digital media delivery device. This may include for example, a device which enables the delivery of audio, video or textual content through human perceivable output devices and/or on machine readable media. Other exemplary devices may include a tanning device, an aroma therapy device, a medication dispensing device, an oxygen delivery device, a beverage dispensing device or other devices which may be used to provide or redeem goods or services.

The approach schematically represented in FIG. 6 may enable third parties interested in having transactions that are not normally carried out in conjunction with the operation of an ATM to nonetheless be achieved by providing developers with the necessary software and information to develop support for such devices. Support for such devices may not normally be economically feasible for the manufacturer of ATMs or for financial institutions responsible for operating such ATMs. However, other entities specializing in such devices may wish to do so. Aspects of the embodiments shown which help to assure that an entity responsible for authorizing such software has authorized the software before it will operate the devices helps to assure that such software is properly implemented and that the software operates properly when used in conjunction with the ATM and the corresponding external device. Of course it should be understood that this approach is exemplary and in other embodiments other approaches may be used.

Figure 7:
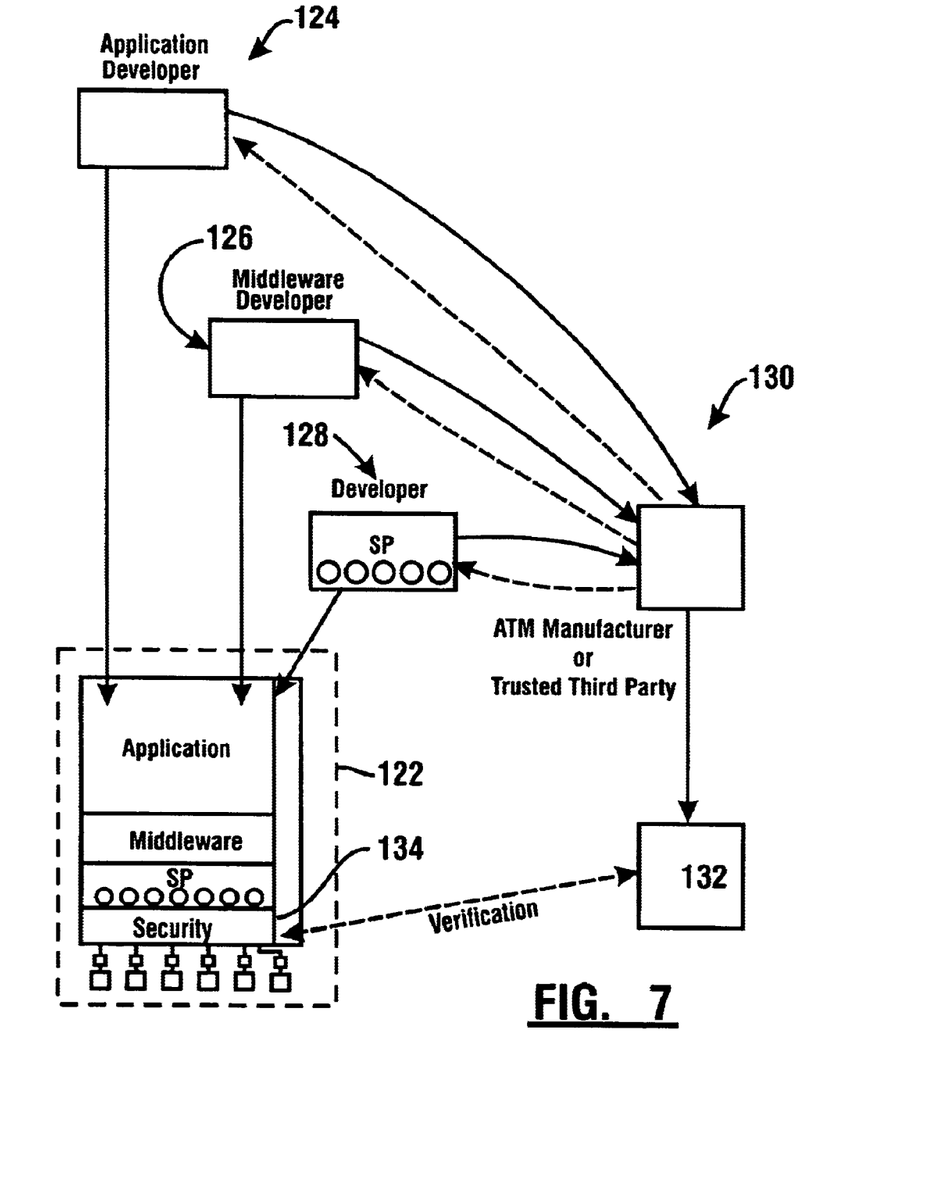
FIG. 7 is a schematic view of a further alternative methodology in which multiple items of software are authorized for use on an ATM, and in which the system verifies compatibility of such multiple software items for use on the ATM.

FIG. 7 schematically represents yet another approach. FIG. 7 represents the situation where multiple software components used in an ATM may have been produced or modified by different development entities. ATM 122 includes application software, middleware software and service provider software operating therein. The application software is provided by an application developer referred to as 124, the middleware is developed by a middleware developer 126 and the service provider software is provided by a developer 128. As represented in FIG. 7 an authorizing entity such as the ATM manufacturer or other third party 130 receives the software. The entity 130 may also be responsible for testing and certifying the software, licensing the software or other activities. The entity 130 may also provide verification features that are included in some or all of the software components as previously discussed. Further in some exemplary embodiments the entity 130 may include in the software, features which indicate whether a software component is suitable for operation with one or more certain other software and/or hardware components. These features may include in some embodiments the verification features. In other embodiments it may include other or additional features that are included in or which may be associated with the software.

As represented in FIG. 7 the entity 130 may further operate a remote computer 132. Remote computer 132 is adapted to communicate with the ATM 122. In some embodiments security software 134 operates as part of a software verification device in the manner previously discussed to verify the authorization of one or more of the software components by communication with the remote computer. Further, in some exemplary embodiments the software verification device is operative to verify either at the ATM and/or through communication with the remote computer 132 that the software components installed on the machine are suitable for operation together, or with one or more hardware devices in the ATM.

As can be appreciated in exemplary embodiments security software or other appropriate software or hardware may operate as a software verification device, and may serve to prevent operation of one or more transaction function devices by the software unless the software is verified as authorized by the entity and that the software components have been indicated by the entity as suitable for use together and/or with the particular hardware. Responsive to determining that such software components are authorized and are suitable for use, the software verification device enables the software to operate one more transaction function devices to carry out at least one transaction function.

As can be appreciated in various embodiments ATMs may include in operative connection with the processor, devices for reading media bearing instructions which comprise the software. This may include, for example, a CD drive, disk drive, tape drive or other suitable device for enabling the processor to read the instructions thereon. Such media reading devices may be used to load the software components onto the ATM from appropriate media.

In further alternative embodiments provisions may be made for facilitating the identification of malfunctioning hardware or software components. This may be particularly important in the operation of open systems where different entities provide ATM hardware or various components thereof or service thereto, as well as the various software components that operate on the ATM. As can be appreciated, in carrying out many ATM functions multiple software and hardware components operate in an interdependent manner to carry out a transaction. For example, the application software may generate messages to carry out one or more functions which are directed to the middleware component. The middleware component responsive to the message from the application, generates one or more messages to the service provider software component. The service provider software responsive to the one or more messages from the middleware, generates one or more messages to operate transaction function devices. The devices generally cause one or more responses to be provided back to the service provider software. The service provider software will provide one or more responses to the middleware component, which may provide one or more responses to the application component. As can be appreciated, if the ATM does not work it may be challenging to determine the cause of the problem.

In an exemplary embodiment, one or more of the software components is configured to cause the processor responsive to one or more inputs, to conduct one or more tests of one or more of the software component's functional capabilities. In some cases, this testing is enabled to be conducted by the component independent of at least one other software component that must normally work in an interdependent manner with the software subject to test to carry out an ATM transaction or function. The processor responsive to at least one result produced by the test, provides at least one output from the ATM that is indicative of the results. Inputs that cause the test to be conducted and the at least one output produced by the machine indicative of test results may include outputs through a screen or other output device that can be perceived by a servicer at the ATM. Alternatively or in addition, the inputs instructing the processor to conduct the test may be received by the ATM from a remote computer and the outputs indicative of results of the test may be communicated through a communication device from the ATM to a remote computer. Of course other approaches may be used.

In some embodiments the software component with the test capabilities may include or operate in conjunction with instructions which simulate the operation of other software and/or transaction function devices. For example, in executing the functional test capabilities, the software component may cause the processor to present to the software one or more appropriate responses that would be received from another software (and/or hardware) component operating properly in the machine. In this way the software component may test one or more of its own functional capabilities without having to rely on the proper functioning of at least one other software or hardware component.

In some embodiments the testing of some software components may include testing the operation of one or more interrelated hardware or software components. This may include for example the service provider software conducting tests which actually cause transaction function devices to operate. In this way the service provider software which is often a close layer to the transaction function devices can verify not only its own proper operation, but also the operation of at least some of the hardware devices. In some embodiments the outputs provided that are indicative of results of one or more tests may include information indicative of a particular device, sensor, module, driver or other hardware or software component in the ATM which did not fulfill one or more tests.

In some embodiments a software component may have the capability to conduct a test of its own functional capabilities independent of any other hardware or software, as well as to conduct at least one test in which the software operates in conjunction with other hardware or software. For example, the service provider software may cause the processor to operate to conduct at least one test where at least one proper response from a transaction function device is simulated. Thereafter if the results of the test of the software indicates the service provider software is functioning properly, another test exercising one or more actual transaction function devices may be conducted, and an output indicative of the results provided responsive to operation of at least one ATM processor. In this way a problem can be more readily identified as involving either the software component or a hardware component.

Alternatively or in addition, software components may be configured to test their own functionality independently, and/or may be configured to test interoperation with one or more other software components. In this way the ATM can provide for example, outputs indicative of test results for each tested component, as well as the functionality that two or more software components (plus perhaps hardware components) provide together. In some embodiments testing capabilities may be included so that additional testing of components can be done so that components can be tested together until a problem area is identified. Such testing can also be done in some embodiments using a plurality of software components that each test operability with another software component to isolate the source of problems. Further, in some embodiments such capabilities may provide servicers with the capabilities for providing work arounds for problems, including the ability to diagnose and provide the remedy of work around remotely from the ATM. Of course other approaches may be used.

As can be appreciated the features of providing verification that software components are authorized to work in the ATM, as well as that software components are authorized to operate or be used together, may or may not be used in ATMs with software that includes diagnostic capabilities like those described. Further in some embodiments, verification features and identifying aspects of software components can be used in determining diagnostic capabilities as well as in determining the authority of an entity attempting to make changes to the machine or its software configuration. Of course the approaches and usage described herein are exemplary and the scope of the invention is not limited thereto.

It should further be understood that although the exemplary forms of the invention have been described with regard to software having a particular architecture and which include applications which may generally be operated in ATM hardware provided by a plurality of manufacturers, the principles of embodiments of the invention maybe used in conjunction with other types of ATMs and hardware and software architectures.

Thus the new automated banking machine software, system and method of the exemplary forms of the present invention achieve the above stated objectives, eliminate difficulties encountered in the use of prior systems, solve problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

I claim:

1. Apparatus comprising:
   an automated teller machine associated with an entity, including:
   a plurality of transaction function devices including a cash dispenser;
   at least one processor in operative connection with at least one data store;
   first software operative in the at least one processor and adapted to cause the at least one transaction function device to operate;
   at least one software verification device;
   wherein the at least one processor is in operative connection with the plurality of transaction function devices and the at least one software verification device, and wherein the software verification device is operative to prevent the first software from causing operation of the at least one transaction function device and to cause the machine to determine if the first software is authorized by the entity to operate, and wherein the software verification device is operative responsive to such determination to enable the first software to cause operation of the at least one transaction function device.

2. The apparatus according to claim 1 wherein the automated teller machine further comprises:
   service provider software operative in the at least one processor and enabling operation of the machine responsive to application software adapted to operate automated teller machines of a plurality of different manufacturers, wherein at least one of the service provider software and the application software comprises the first software.

3. The apparatus according to claim 2 wherein the application software comprises the first software, and wherein the application software comprises at least one verification feature included in the application software by the entity, and wherein the at least one verification device is operative to determine if the application software is authorized by the entity to operate responsive to the at least one verification feature.

4. The apparatus according to claim 3 wherein the at least one verification feature includes a digital signature associated with the application software.

5. The apparatus according to claim 2 wherein the at least one verification feature includes a hash of at least a portion of the first software.

6. The apparatus according to claim 2 wherein the verification feature includes at least one measurable parameter of the first software.

7. The apparatus according to claim 2 wherein the at least one verification device is operative to cause the machine to determine if the first software is authorized by the entity without the machine communicating with a remote computer.

8. The apparatus according to claim 4 wherein the at least one verification device is operative to cause the machine to verify the digital signature without the machine communicating with a remote computer.

9. The apparatus according to claim 2 and further comprising:
a remote computer associated with the entity;
wherein the at least one verification device is operative to cause the machine to communicate with the remote computer, and wherein the determination that the first software is authorized by the entity is made responsive to communication with the remote computer.

10. The apparatus according to claim 9 wherein the first software is in operative connection with the remote computer, and wherein at least one of the machine and the remote computer is operative to resolve at least one identifying feature of the first software, and wherein the determination is made responsive to the at least one resolved identifying feature.

11. The apparatus according to claim 10 wherein each of the machine and the remote computer are operative to resolve the at least one identifying feature, and the determination is made responsive to a corresponding relationship between at least one identifying feature resolved by each of the machine and the remote computer.

12. The apparatus according to claim 11 wherein the at least one identifying feature is resolved responsive to at least one measurable parameter of the first software.

13. The apparatus according to claim 11 wherein the at least one identifying feature comprises a hash of at least a portion of the first software.

14. The apparatus according to claim 1 and further comprising:
second software other than the first software operative in the at least one processor and adapted to cause the at least one transaction function device to operate;
and wherein the at least one software verification device is operative to prevent the second software from causing operation of the at least one transaction function device and to cause the machine to determine if the second software is authorized by the entity to operate in the machine, and responsive to the determinations concerning the first software and the second software, the at least one software verification device is operative to enable the first software and the second software to cause operation of at least one transaction function device.

15. The apparatus according to claim 14 wherein the at least one transaction function device enabled to be operated responsive to the determinations, includes the cash dispenser.

16. The apparatus according to claim 14 wherein the at least one software verification device is further operative to cause the machine to determine whether the first and second software are indicated by the entity to be suitable for operation together in the machine, and wherein the at least one software verification device is operative to prevent operation of the at least one transaction function device unless it is determined that the first and second software is indicated as suitable by the entity for such operation.

17. The apparatus according to claim 16 wherein the first and second software comprise at least two of application software, middleware software, and service provider software.

18. The apparatus according to claim 16 wherein the determination made responsive to the at least one software verification device as to whether the first and second software are indicated by the entity as suitable for operation together in the machine, is made responsive to first and second verifying features included in the first and second software respectively, by the entity.

19. The apparatus according to claim 18 wherein the machine is operative to determine if the first and second software are indicated as suitable for operation together without the machine connecting to a remote computer.

20. The apparatus according to claim 16 and further comprising:
a remote computer associated with the entity, the remote computer having accessible data representative of whether the first and second software are indicated by the entity as suitable for operation together in an automated teller machine;
and wherein the determination responsive to the at least one software verification device as to whether the first and second software are suitable for operation together in the automated teller machine, is made responsive to communication by the machine with the remote computer.

21. The apparatus according to claim 20 wherein a copy of at least one of the first and second software is in operative connection with the remote computer, and wherein the machine and the remote computer are operative to determine at least one identifying feature of the at least one of the first and second software, and wherein the software verification device is operative to cause the machine to determine that the at least one first or second software in the machine is authorized by the entity responsive to a relationship between the at least one identifying feature determined by each of the machine and the remote computer.

22. The apparatus according to claim 21 wherein the at least one verifying feature comprises a hash of at least a portion of at least one of the first and second software.

23. The apparatus according to claim 21 wherein the at least one identifying feature comprises a measurable parameter of at least a portion of the at least one first and second software.

24. The apparatus according to claim 21 wherein the at least one identifying feature comprises at least one of a hash and a measurable parameter of at least a portion of both of the first and second software.

25. The apparatus according to claim 1 and further comprising:
an external device operatively connected with the at least one processor of the automated teller machine, but not included in the machine;
and wherein the first software is operative to cause operation of the external device and at least one transaction function device.

26. The apparatus according to claim 25 wherein the first software comprises service provider software operating in the at least one processor and enabling operation of the machine responsive to application software adapted to operate automated teller machines of a plurality of different manufacturers.

27. The apparatus according to claim 26 wherein the external device comprises at least one of an article rental device, an article purchase device, a digital media delivery device, a tanning device, an aroma therapy device, a medication dispensing device, an oxygen delivery device, a beverage dispensing device, a money order printing device, a check printing device, a ticket printing device, a token delivery device, a token receiving device, and a ticket receiving device.

28. An apparatus comprising:
   an automated teller machine associated with an entity, including;
      a plurality of transaction function devices including a cash dispenser;
      at least one processor in operative connection with at least one data store;
      service provider software operative in the at least one processor and enabling operation of the machine responsive to application software adapted to operate automated teller machines of a plurality of different manufacturers;
      wherein at least one of the service provider software and the application software is adapted to cause the at least one transaction function device to operate;
      at least one software verification device;
      wherein the at least one processor is in operative connection with the plurality of transaction function devices and the at least one software verification device, and wherein the software verification device is operative to prevent the at least one of the service provider software and the application software from causing operation of the at least one transaction function device and to cause the machine to determine if the at least one of the service provider software and application software is authorized by the entity to operate, and wherein the software verification device is operative responsive to such determination to enable the at least one of the service provider software and the application software to cause operation of the at least one transaction function device.

29. Apparatus comprising:
   an automated teller machine associated with an entity, including:
      a plurality of transaction function devices including a cash dispenser;
      at least one processor in operative connection with at least one data store;
      first software operative in the at least one processor and adapted to cause the at least one transaction function device to operate;
      second software operative in the at least one processor and adapted to cause at least one transaction function device to operate;
      at least one software verification device;
      wherein the at least one processor is in operative connection with the plurality of transaction function devices and the at least one software verification device, and wherein the at least one software verification
   device is operative to prevent the first software from causing operation of the at least one transaction function device and to cause the machine to determine if the first software is authorized by the entity to operate, wherein the at least one software verification device is operative to prevent the second software from causing operation of the at least one transaction function device and to cause the machine to determine if the second software is authorized by the entity to operate in the machine, wherein the at least one software verification device is further operative to cause the machine to determine whether the first and second software are indicated by the entity to be suitable for operation together in the machine, and responsive to the determinations concerning the first software and the second software, the at least one software verification device is operative to enable the first software and the second software to cause operation of at least one transaction function device, wherein the at least one software verification device is operative to prevent operation of the at least one transaction function device unless it is determined that the first and second software is indicated as suitable by the entity for such operation.

30. Apparatus comprising:
   an automated teller machine associated with an entity, including:
      a plurality of transaction function devices including a cash dispenser;
      at least one processor in operative connection with at least one data store;
      first software operative in the at least one processor and adapted to cause the at least one transaction function device to operate;
      at least one software verification device;
      wherein the at least one processor is in operative connection with the plurality of transaction function devices and the at least one software verification device, and wherein the software verification device is operative to prevent the first software from causing operation of the at least one transaction function device and to cause the machine to determine if the first software is authorized by the entity to operate, and wherein the software verification device is operative responsive to such determination to enable the first software to cause operation of the at least one transaction function device;
   an external device operatively connected with the at least one processor, wherein the external device is located outside the machine, and wherein the first software is further operative to cause operation of the external device.

* * * * *